(12) United States Patent
Rhee et al.

(10) Patent No.: US 8,871,150 B2
(45) Date of Patent: Oct. 28, 2014

(54) APPARATUS AND METHOD FOR SUPPLYING AMINE USING THERMAL DECOMPOSITION

(75) Inventors: In-Hyoung Rhee, Asan-si (KR);
Byung-Gi Park, Cheonan-si (KR);
Hyun-Kyoung Ahn, Seoul (KR);
Hyun-Jun Jung, Suwon-si (KR);
Eun-Sun Jeong, Incheon (KR);
Hyuk-Jun Gwon, Seoul (KR); Chan-ho Song, Gumi-si (KR)

(73) Assignee: Soonchunhyang University Industry Academy Cooperation Foundation, Asan-si (KR)

( * ) Notice: Subject to any disclaimer, the term of this patent is extended or adjusted under 35 U.S.C. 154(b) by 236 days.

(21) Appl. No.: 13/149,429

(22) Filed: May 31, 2011

(65) Prior Publication Data

US 2011/0291052 A1 Dec. 1, 2011

(30) Foreign Application Priority Data

Jun. 1, 2010 (KR) .................. 10-2010-0051622

(51) Int. Cl.
| | | |
|---|---|---|
| *F01N 3/28* | (2006.01) | |
| *C01B 3/04* | (2006.01) | |
| *B01J 8/04* | (2006.01) | |
| *G21C 17/022* | (2006.01) | |

(52) U.S. Cl.
CPC ........... *B01J 8/0453* (2013.01); *G21C 17/0225* (2013.01); *C01B 3/04* (2013.01); *B01J 2208/00415* (2013.01); *B01J 2208/00061* (2013.01); *Y02E 60/364* (2013.01)

USPC ............... 422/107; 422/13; 422/119; 252/54; 252/76; 252/389

(58) Field of Classification Search
USPC ................... 422/119, 13, 107; 252/76, 389.54
See application file for complete search history.

(56) References Cited

U.S. PATENT DOCUMENTS

| 4,153,581 A * | 5/1979 | Habermann ................... 502/329 |
| 4,381,206 A * | 4/1983 | Grant et al. ..................... 149/22 |
| 6,881,244 B2 * | 4/2005 | Liebig et al. .................... 95/235 |

FOREIGN PATENT DOCUMENTS

| JP | 2006506224 A | 2/2006 |
| KR | 89001035 B1 | 4/1989 |
| KR | 1020060087653 A | 8/2006 |
| WO | 2004045767 A2 | 6/2004 |

* cited by examiner

*Primary Examiner* — Sally Merkling
(74) *Attorney, Agent, or Firm* — Sughrue Mion, PLLC

(57) ABSTRACT

Provided are an apparatus for supplying amine, including: transfer pipe through which amine is transferred; a heat wire which heats the amine that flows through the transfer pipe; a temperature control sensor which controls the temperature in the transfer pipe; and a product recovery valve which recovers product resulting from thermal decomposition of the amine, and a method for supplying amine using the same. The apparatus and method for supplying amine are capable of economically and effectively supplying amine utilizing the thermal decomposition properties of the amine, and may be used to supply amine, for example, to circulating water for power plants.

4 Claims, 1 Drawing Sheet

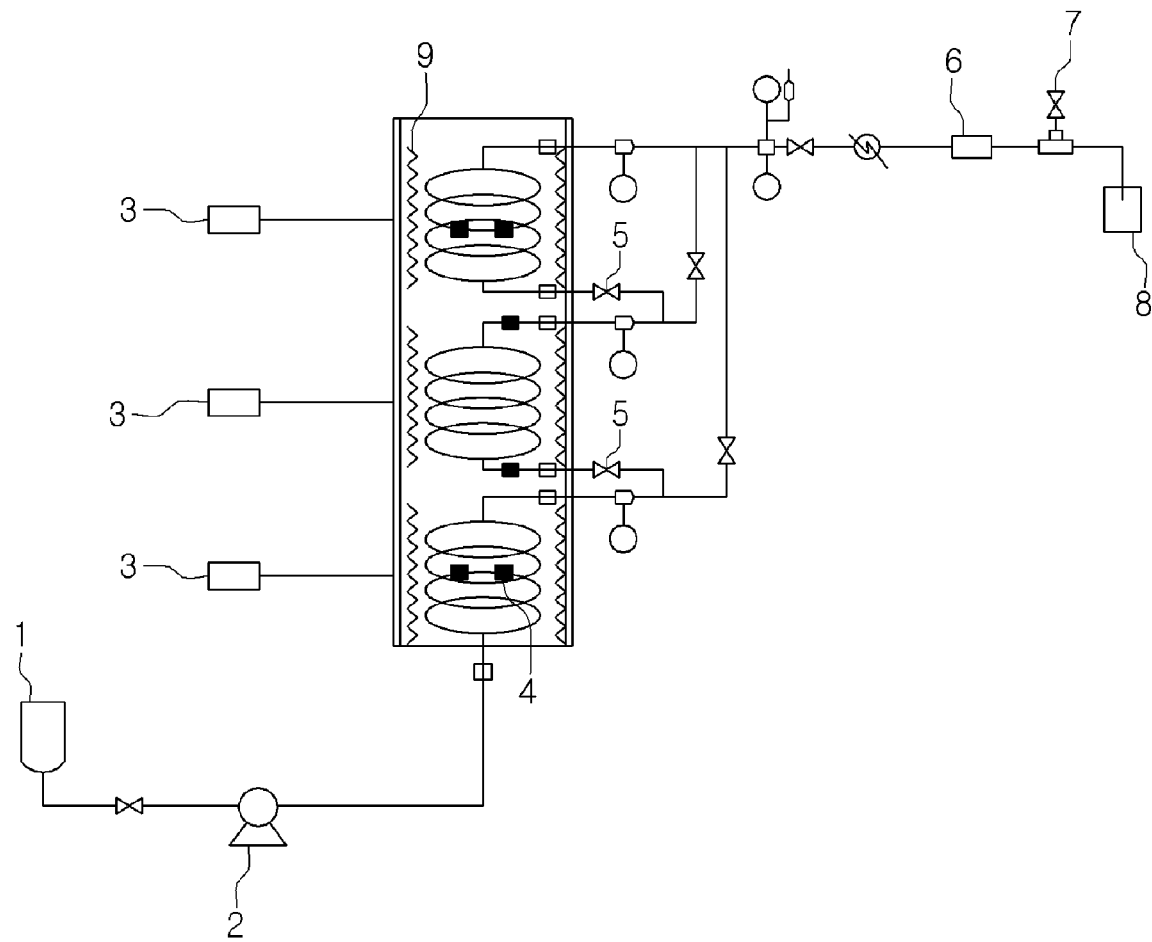

APPARATUS AND METHOD FOR SUPPLYING AMINE USING THERMAL DECOMPOSITION

CROSS-REFERENCE TO RELATED APPLICATION

This application claims priority to Korean Patent Application No. 10-2010-0051622, filed on Jun. 1, 2010, and all the benefits accruing therefrom under 35 U.S.C. §119, the contents of which in its entirety are herein incorporated by reference.

BACKGROUND OF THE INVENTION

1. Field of the Invention

This disclosure relates to an apparatus for supplying amine and a method for supplying amine using the apparatus.

2. Description of the Prior Art

At nuclear power plants or thermal power stations, various chemicals are used to prevent corrosion of piping by maintaining it under basic, reduced state. For example, hydrazine is used to keep the piping in reduced state by removing dissolved oxygen, and amine is used to keep the piping under a basic pH condition so as to minimize corrosion.

Since amines have different physical and chemical properties, it is necessary to use adequate amines or amine-based compounds depending on the environment and condition of the corresponding piping or facility.

SUMMARY OF THE INVENTION

Accordingly, an embodiment of the present invention has been made to solve the above problems. An object of an embodiment of the invention is to provide an apparatus for supplying amine using thermal decomposition.

Another object of an embodiment of the invention is to provide a method for supplying amine.

In one aspect, there is provided an apparatus for supplying amine, including: a transfer pipe through which amine is transferred; a heat wire which heats the amine that flows through the transfer pipe; a temperature control sensor which controls the temperature in the transfer pipe; and a product recovery valve which recovers product resulting from thermal decomposition of the amine.

In another aspect, there is provided a method for supplying amine, including: heating amine; and recovering product resulting from thermal decomposition of the amine.

The apparatus and method for supplying amine according to this disclosure are capable of economically and effectively supplying amine using thermal decomposition of the amine.

BRIEF DESCRIPTION OF THE DRAWING

The above and other aspects, features and advantages of the disclosed exemplary embodiments will be more apparent from the following detailed description taken in conjunction with the accompanying drawing in which:

FIG. 1 schematically shows an apparatus for supplying amine according to an embodiment.

DETAILED DESCRIPTION

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The shape, size and regions, and the like, of the drawing may be exaggerated for clarity.

An apparatus for supplying amine according to an embodiment of the disclosure comprises: a transfer pipe through which amine is transferred; a heat wire which heats the amine that flows through the transfer pipe; a temperature control sensor which controls the temperature in the transfer pipe; and a product recovery valve which recovers product resulting from thermal decomposition of the amine. The apparatus for supplying amine may be used to supply amine, for example, to circulating water for power plants. Specifically, it may be used to prevent corrosion of piping or the like by maintaining a basic pH.

The amine that is thermally decomposed by the apparatus for supplying amine is not particularly limited. The thermal decomposition product may vary depending on the kind of the supplied amine, heating temperature, heating time, pressure, or the like. For example, the thermal decomposition by the apparatus for supplying amine may occur as in Reaction Scheme 1.

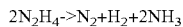  [Reaction Scheme 1]

In an embodiment, the apparatus for supplying amine may further comprise a catalyst that promotes thermal decomposition of the amine. The catalyst is not particularly limited but may be one or more selected from a group consisting of cobalt (Co), nickel (Ni), platinum (Pt), iridium (Ir), ruthenium (Ru), rhodium (Rh), rhenium (Re), iron (Fe), molybdenum (Mo), osmium (Os) and palladium (Pd). The catalyst may be packed in the transfer pipe in a tubular form. By inserting a tubular catalyst layer in the transfer pipe through which the amine is transferred, the time required for thermal decomposition can be reduced without affecting its flow rate.

In another embodiment, the apparatus for supplying amine may further comprise an inflow volume control pump that controls residence time in the transfer pipe. Through control of the flow rate, the residence time of the amine in the transfer pipe can be controlled, and the amine can be recovered with high concentration. The residence time may also be controlled by controlling the length or diameter of the transfer pipe. The residence time is in proportion to the length of the transfer pipe and is in inverse proportion to the diameter of the transfer pipe. In an embodiment, the transfer pipe may be extendable or shrinkable in the length direction or may be replaceable. By controlling the length of the transfer pipe or replacing it with a pipe having an adequate length and diameter, thermal decomposition conditions effective for various amines at various concentrations may be established. As such, the residence time of the amine in the transfer pipe may be controlled by controlling the flow rate of the amine, length of the transfer pipe, diameter of the transfer pipe, or the like.

A method for supplying amine using thermal decomposition according to an embodiment of the disclosure comprises: (a) heating amine; and (b) recovering product resulting from thermal decomposition of the amine. At nuclear power plants or thermal power stations, amine is used to maintain piping by under basic, reduced state. By using the thermal decomposition properties of the amine, various amines may be supplied depending on the thermal decomposition temperature.

In another embodiment, the step (a) of heating amine may comprise heating amine using a heat wire equipped at a transfer pipe through which the amine is transferred and a tubular catalyst layer may be packed in the transfer pipe to promote the thermal decomposition of the amine. The wire equipped at the transfer pipe controls heating temperature through a temperature control sensor. Further, an additional vacuum pump may be used to control the pressure in the transfer pipe.

For heating the amine, the method for supplying amine may use a catalyst. In an embodiment, one or more catalyst(s) selected from a group consisting of cobalt (Co), nickel (Ni), platinum (Pt), iridium (Ir), ruthenium (Ru), rhodium (Rh), rhenium (Re), iron (Fe), molybdenum (Mo), osmium (Os) and palladium (Pd) may be used to promote the thermal decomposition of the amine.

In an embodiment, residence time of the amine in the transfer pipe may be controlled by controlling one or more of inflow volume of the amine, length of the transfer pipe and diameter of the transfer pipe. The residence time is controlled by amine inflow volume, and is in proportion to the length of the transfer pipe and is in inverse proportion to the diameter of the transfer pipe. By controlling the amine inflow volume or length of the transfer pipe or replacing it with a pipe having an adequate length and diameter, thermal decomposition compositions effective for various amines at various concentrations may be established. As such, the residence time of the amine in the transfer pipe may be controlled by controlling the flow rate of the amine, length of the transfer pipe, diameter of the transfer pipe, or the like.

The heating temperature and the residence time during which the heating is performed may be controlled variously depending on the type and uses of amines. In an embodiment, the heating temperature may be 100 to 300° C. and the residence time may be 2 to 10 minutes. More specifically, the heating temperature may be 150 to 250° C. and the residence time may be 4 to 8 minutes. By controlling the amine heating temperature and the heating time, various amines or highly concentrated amines may be obtained effectively.

Hereinafter, the disclosure is described in further detail referring to the attached drawing. However, the scope of the disclosure is not limited thereto.

FIG. 1 schematically shows an apparatus for supplying amine according to an embodiment. Referring to FIG. 1, an amine injection tank 1 supplies amine. The inflow volume of the supplied amine is controlled by a metering pump 2. The supplied amine is heated by a heat wire 9 provided on the wall of a transfer pipe. The heating temperature is controlled by a temperature control sensor 3. And, the pressure inside the transfer pipe is controlled by a pressure control sensor 6.

Inside the transfer pipe, a plurality of tubular line filters 4 are provided. The line filter is 4 filled with a thermal decomposition catalyst. The thermal decomposition catalyst may be cobalt (Co), nickel (Ni), platinum (Pt), or the like. The transfer pipe is extendable or shrinkable in the length direction and is replaceable, if necessary. When replacing the transfer pipe, the length and/or diameter of the pipe may be changed.

A thermal decomposition product resulting from thermal decomposition of the amine heated by the heat wire 9 is recovered by a recovery valve 5 and is stored in a storage tank 8 after passing through a sampling valve 7.

The provided apparatus and method for supplying amine may be utilized in power plants to supply amine.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. An apparatus for supplying amine, comprising:
   a transfer pipe through which amine is transferred;
   a heat wire which heats the amine that flows through the transfer pipe to decompose the amine, wherein the temperature of heating is in the range from 100 ° C. to 300 ° C.;
   a temperature control sensor which controls the temperature in the transfer pipe;
   a catalyst provided in the transfer pipe, said catalyst promoting thermal decomposition of the amine;
   a product recovery valve which recovers product resulting from thermal decomposition of the amine from the transfer pipe, and is connected with the transfer pipe; and
   an inflow volume control pump which controls residence time of the amine in the transfer pipe,
   wherein the transfer pipe is extendable or shrinkable in the length direction or is replaceable,
   wherein the residence time of the amine in the transfer pipe is 2 to 10 minutes.

2. The apparatus for supplying amine according to claim 1, wherein the catalyst is one or more selected from the group consisting of cobalt (Co), nickel (Ni), platinum (Pt), iridium (Ir), ruthenium (Ru), rhodium (Rh), rhenium (Re), iron (Fe), molybdenum (Mo), osmium (Os) and palladium (Pd).

3. The apparatus for supplying amine according to claim 2, wherein the catalyst is provided in the transfer pipe in a tubular form.

4. The apparatus for supplying amine according to claim 1, wherein the heat wire is provided within the transfer pipe.

\* \* \* \* \*